United States Patent
Rhodes

(10) Patent No.: US 9,928,232 B2
(45) Date of Patent: Mar. 27, 2018

(54) TOPICALLY AWARE WORD SUGGESTIONS

(71) Applicant: Microsoft Technology Licensing, LLC, Redmond, WA (US)

(72) Inventor: Alexander C. Rhodes, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/040,947

(22) Filed: Feb. 10, 2016

(65) Prior Publication Data

US 2016/0253312 A1 Sep. 1, 2016

Related U.S. Application Data

(60) Provisional application No. 62/126,307, filed on Feb. 27, 2015.

(51) Int. Cl.
*G06F 17/27* (2006.01)
*G06F 17/20* (2006.01)
*G06F 17/21* (2006.01)

(52) U.S. Cl.
CPC .......... *G06F 17/276* (2013.01); *G06F 17/277* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 5,828,999 A * 10/1998 Bellegarda ............. G06K 9/726 704/231
6,983,247 B2 * 1/2006 Ringger ................. G06F 17/277 704/251
(Continued)

FOREIGN PATENT DOCUMENTS

| WO | WO2006078912 | 7/2006 |
| WO | WO2013151546 A1 | 10/2013 |
| WO | WO2015006944 A1 | 1/2015 |

OTHER PUBLICATIONS

Baskaya, et al., "AI-KU: Using Substitute Vectors and Co-Occurrence Modeling for Word Sense Induction and Disambiguation", Second Joint Conference on Lexical and Computational Semantics, Jun. 2013, pp. 300-306.
(Continued)

*Primary Examiner* — Lamont Spooner
(74) *Attorney, Agent, or Firm* — Scott Y. Shigeta; Newport IP, LLC

(57) ABSTRACT

Concepts and technologies are described herein for providing topically aware word suggestions. Using a text input, the system determines a conditional count and an unconditional count. The system then determines an adjustment factor for a pair of words of the plurality of words based on the unconditional count and the conditional count. The system then generates a data structure defining a plurality of word clusters. The system then reconstructs the adjustment factor of the pair of words based on a number of common clusters between individual words of the pair of words. The adjustment factor is combined with other data, such as data from a language model dictionary and a freshness factor from an average cluster activation state table to determine a probability associated with a word candidate, which is displayed to a user.

20 Claims, 8 Drawing Sheets

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795
USPC .................................................. 704/1, 9, 10
See application file for complete search history.

(56) References Cited

U.S. PATENT DOCUMENTS

| | | | |
|---|---|---|---|
| 7,383,258 B2 | 6/2008 | Harik et al. | |
| 8,108,392 B2 | 1/2012 | Marvit et al. | |
| 8,249,871 B2 | 8/2012 | Mukerjee | |
| 8,311,805 B2 | 11/2012 | Parikh | |
| 8,392,453 B2 | 3/2013 | Baluja | |
| 8,732,173 B2 | 5/2014 | Mizuguchi et al. | |
| 8,744,833 B2* | 6/2014 | Maeda | G06F 17/2223 704/1 |
| 9,141,882 B1* | 9/2015 | Cao | G06K 9/6251 |
| 9,367,526 B1* | 6/2016 | Vozila | G06Q 10/107 |
| 2003/0055655 A1* | 3/2003 | Suominen | G06F 3/167 704/276 |
| 2009/0249198 A1 | 10/2009 | Davis et al. | |
| 2011/0137921 A1* | 6/2011 | Inagaki | G06F 17/3069 707/749 |
| 2011/0170777 A1* | 7/2011 | Inagaki | G06F 17/30705 382/177 |
| 2012/0065976 A1* | 3/2012 | Deng | G10L 15/14 704/256.1 |
| 2013/0339895 A1 | 12/2013 | Hirshberg | |
| 2014/0163954 A1 | 6/2014 | Joshi et al. | |
| 2014/0237356 A1 | 8/2014 | Durga et al. | |
| 2015/0206031 A1* | 7/2015 | Lindsay | G06K 9/6215 382/218 |

OTHER PUBLICATIONS

Dagan, et al., "Similarity-Based Models of Word Cooccurrence Probabilities", Journal of Machine Learning—Special Issue on Natural Language Learning, vol. 34, Issue 1-3, Feb. 1999, 31 pages.
The PCT Search Report and Written Opinion dated May 11, 2016 for PCT application No. PCT/US2016/017761, 14 pages.
"Second Written Opinion Received For PCT Application No. PCT/US2016/017761", dated Jan. 25, 2017, 6 Pages.
PCT Application No. PCT/US2016/017761, International Preliminary Report on Patentability, dated May 10, 2017, 7 Pages.

* cited by examiner

TOPICALLY AWARE WORD SUGGESTIONS

CROSS-REFERENCE TO RELATED APPLICATION

This application claims the benefit of U.S. Provisional Patent Application Ser. No. 62/126,307 filed on Feb. 27, 2015, entitled "TOPICALLY AWARE WORD SUGGESTIONS," the entirety of which is expressly incorporated herein by reference.

BACKGROUND

As users enter text on a computing device, such as a phone, some technologies provide suggestions on a word they may be trying to type or a word that may come next in the sentence. To generate word suggestions, there are a number of technologies that are designed to identify relevant words. For instance, some models analyze common sequences of words in a data set, and when a specific word of a sequence is entered in a device, a word that typically follows the specific word is suggested to the user. In one example, if a user enters the word "heart," most systems using this sequence-based technology would suggest the word "attack" since samples sets may indicate that sequence of words.

Other technologies may use user personalization data to generate word suggestions. For example, a device may store text data from a user's input. The device may then analyze words or sequences of words that are frequently used by a particular user to suggest words to a user.

Although existing technologies provide word suggestions, there is room for improvement. For example, existing technologies are unaware of the context of the user's input and/or other text related to the input. The analysis of word sequences simply cannot interpret a broader meaning to provide a contextually relevant suggestion.

It is with respect to these and other considerations that the disclosure made herein is presented.

SUMMARY

Concepts and technologies are described herein for providing topically aware word suggestions. In one aspect, a system is configured to receive an input containing a plurality of words. Using the input, the system determines a conditional count and an unconditional count. The system then determines an adjustment factor for a pair of words of the plurality of words based on the unconditional count and the conditional count. The system then generates a data structure defining a plurality of word clusters, where the individual word clusters of the plurality of word clusters include at least one word of the plurality of words. The system then reconstructs the adjustment factor of the pair of words based on a number of common clusters between individual words of the pair of words. The adjustment factor is combined with other data, such as data from a language model dictionary and a freshness factor from an average cluster activation state table to determine a probability associated with a word candidate. One or more word candidates are displayed to a user based on the probability.

The techniques described herein utilize data from a number of sources to provide automatic inclusion of contextual awareness to a text input, which allows implementations to dynamically identify topics and provide word suggestions based on the topics. According to various embodiments, data structures may store usage data particular to an application and a person. The data is used from both data structures to find a grouping of topically relevant words. Based on one or more calculated probabilities a word candidate is selected from the grouping of topically relevant words.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
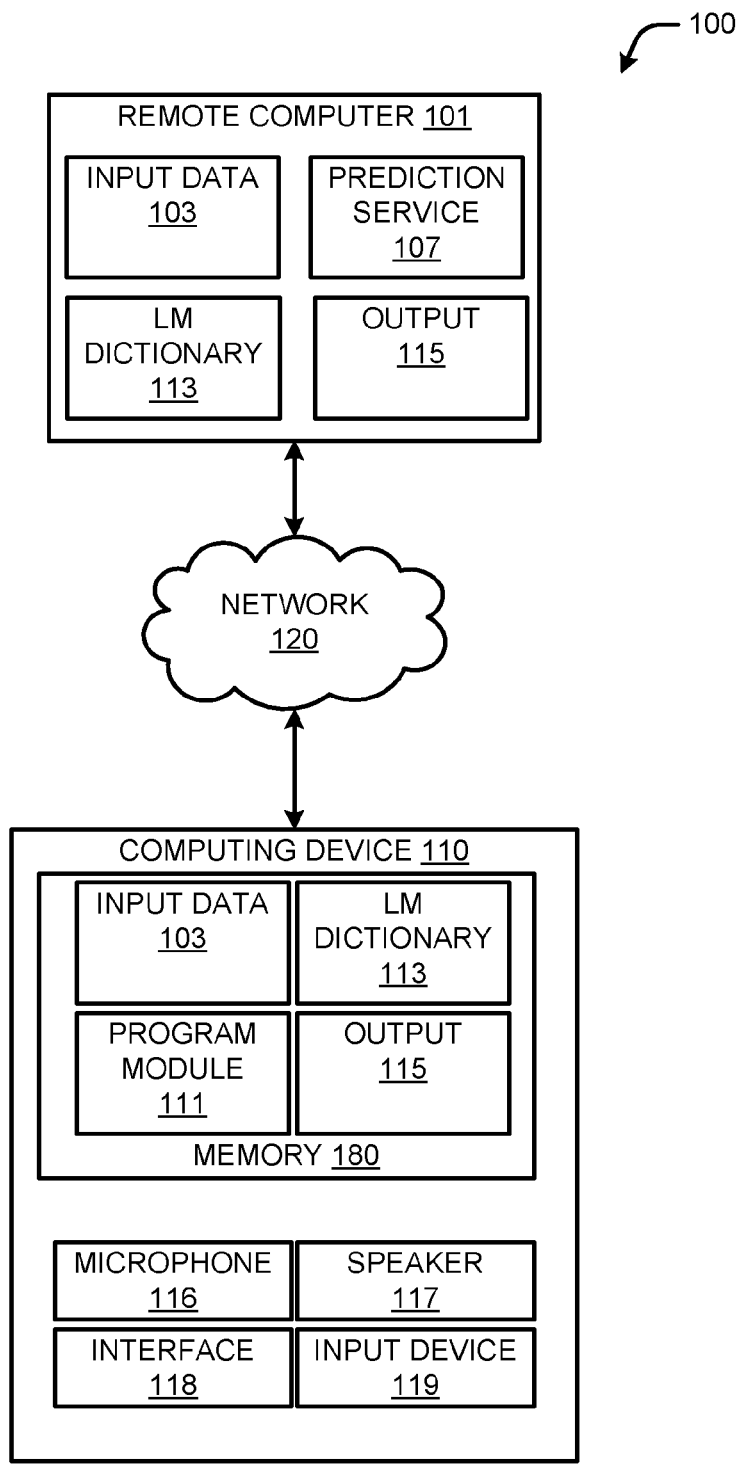
FIG. 1 is a block diagram showing several example components for providing topically aware word suggestions.

The technologies described herein provide topically aware word suggestions. In one aspect, a system is configured to receive an input containing a plurality of words. Using the input, the system determines a conditional count and an unconditional count. The system then determines an adjustment factor for a pair of words of the plurality of words based on the unconditional count and the conditional count. The system then generates a data structure defining a plurality of word clusters, where the individual word clusters of the plurality of word clusters include at least one word of the plurality of words. The system then reconstructs the adjustment factor of the pair of words based on a number of common clusters between individual words of the pair of words. The adjustment factor is combined with other data, such as data from a language model dictionary and a freshness factor from an average cluster activation state table to determine a probability associated with a word candidate. One or more word candidates are displayed to a user based on the probability.

The techniques described herein utilize data from a number of sources to provide automatic inclusion of contextual awareness to a text input, which allows implementations to dynamically identify topics and provide word suggestions based on the topics. According to various embodiments, data structures may store usage data particular to an application and a person. The data is used from both data structures to find a grouping of topically relevant words. Based on one or more calculated probabilities a word candidate is selected from the grouping of topically relevant words.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for providing topically aware word suggestions will be described.

FIG. 1 is a system diagram showing aspects of one illustrative mechanism disclosed herein for providing topically aware word suggestions. As shown in FIG. 1, a system 100 may include a remote computer 101, a computing device 110 and a network 120. The computing device 110 may operate as a stand-alone device, or the computing device 110 may operate in conjunction with the remote computer 101. As can be appreciated, the remote computer 101 and the computing device 110 are interconnected through one or more local and/or wide area networks, such as the network 120. It should be appreciated that many more network connections may be utilized than illustrated in FIG. 1.

The computing device 110 may include a local memory 180 that stores the input data 103, a language model dictionary 113, an output 115 and other data described herein. The computing device 110 may also include a program module 111 configured to manage interactions between a user and the computing device 110. The program module 111 may be in the form of a game application, an office productivity application, an operating system component or any other application with features that interact with the user via speech or text communication.

The computing device 110 might also include a speech module 113 that is configured to operate in conjunction with a microphone 116 and a speaker 117. The speech module 113 may include mechanisms for converting user speech into a computer-readable format, such as a text or binary format. As can be appreciated, the speech module 113 may include a number of known techniques for converting a user's voice to a computer-readable format. Text may also be received from a user through the input device 119, which may include any device for receiving text. This may include a soft keyboard on a display interface a hardware keyboard or any other device.

The speech module 113 may also operate in conjunction with a prediction service 107 on the remote computer 101 to capture and interpret speech input received at the computing device 110. As can be appreciated, the speech service 107 may utilize resources of a multiple-computer system to translate, transcribe, or otherwise interpret any type of speech input. The computing device 110 may also include an interface 118, which may be in the form of a visual display for communicating text and graphics to the user. The computing device 110 may also include an input device 119, which may be in the form of a keyboard or any other type of hardware for receiving any form of user input to the program module 111.

In some illustrative examples, the program module 111 is a software component of an operation system, an application that may include any generic function such as a word processing application and email application, or the application may provide a specialty function, such as a baseball application or a fantasy football application. The program module 111 may be configured to operate with the input device 119 and/or the speech module 113 can provide text entries using a keyboard or by any other form of communication such as speech or movement gestures. In embodiments such as those described above, techniques disclosed herein can be utilized to enhance a user experience by suggesting words to a user while the user is entering text. As described in more detail below, the techniques described herein identify contextually relevant topics and words related to the identified topics. As can be appreciated, the examples of the program module 111 described above are provided for illustrative purposes and are not to be construed as limiting.

The remote computer 101 may be in the form of a server computer or a number of server computers configured to store the input data 103, a language model dictionary 113, an output 115 and other information associated with the user and related applications. As can be appreciated, the remote computer 101 may store duplicate copies of the data stored on the computing device 110 allowing a centralized service to coordinate a number of client computers, such as the computing device 110.

Figure 2:
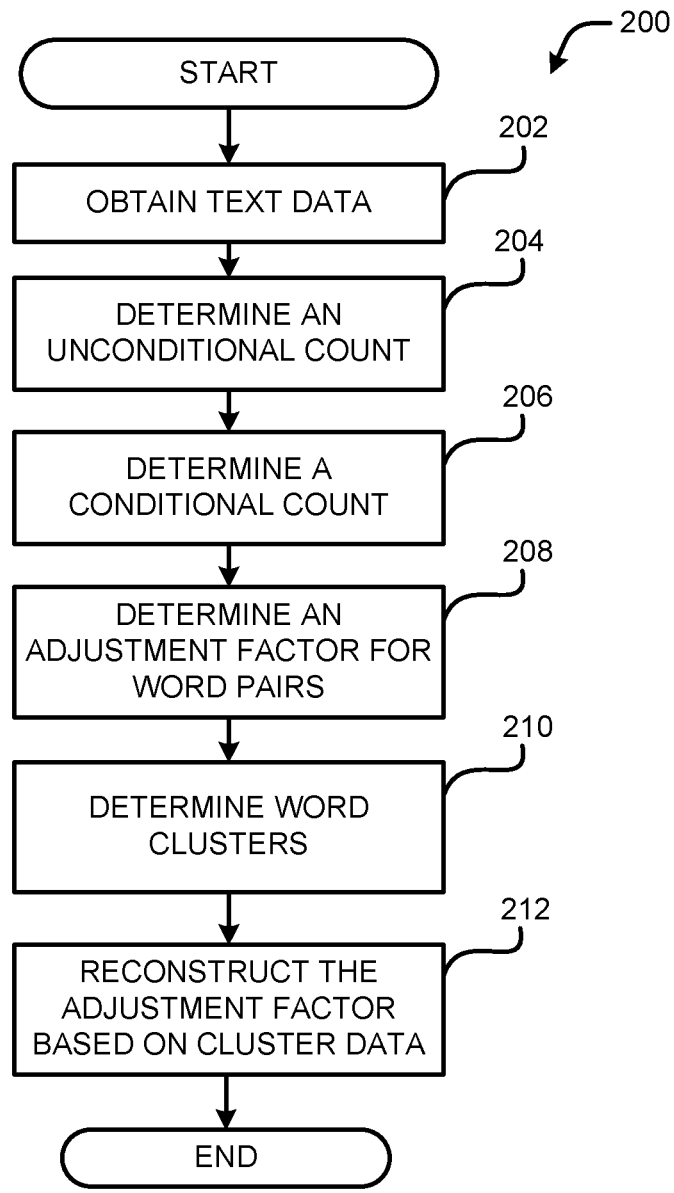
FIG. 2 is a flow diagram illustrating aspects of one illustrative routine for processing data used to provide topically aware word suggestions.

Turning now to FIG. 2, aspects of a routine 200 for providing topically aware word suggestions are shown and described below. It should also be understood that the operations disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIG. 6, the operations of the routine 200 and other routines are described herein as being implemented, at least in part, by a program module, such as the program module 111 or other application programs shown in FIG. 6. Although the following illustration refers to the program module 111, it can be appreciated that the operations of the routine 200 may also be implemented in many other ways. For example, the routine 200 may be implemented by the use of a combination of program modules operating on both a client and a server. For example, one or more of the operations of the routine 200 may alternatively or additionally be implemented, at least in part, by the remote computer 101 hosting a service for providing text suggestions.

With reference to FIG. 2, the routine 200 begins at operation 202, where the program module 111 obtains input text data 103 that is used as a sample set. The input text data 103 may be in any format and may be from any resource. For example, the input text data 103 may be text files from an email system, an authoring application or any other application that may store, process or generate text. The input text data 103 may also include text from a specialty application, such as a baseball application. The input text data 103 may also include text associated with a particular user. The input text data 103 may be in any size. In some configurations, files or text chunks may include 14 words, and the system 100 may receive a number of these chunks and/or files.

As will be described herein, in some scenarios, the text does not have to be in a particular order. For instance, a specific sequence of words does not need to follow the sentences of an email for use with the techniques described herein. For instance, in some configurations, the input may be broken up into blocks of text. In such configurations, the blocks of text may be processed in any order. Regardless of the order of the blocks of text, techniques described herein illustrate how words are associated with a topic to produce a probability used for predicting words and providing word candidates. In addition, in some configurations, the sequence of words in the input text data 103 may be preserved for further processing. For instance, as described below, the input text data 103 may use a specific sequence of words to determine values, such as the conditional probabilities and other values.

Next, in operation 204, the system 100 determines an unconditional count for the words of the input text data 103. The unconditional count is a raw count of the words regardless of the ordering or context. In some configurations, the unconditional count may be derived from any source of data such as text blocks that come from applications or user profiles, for example.

TABLE 1

| UNCONDITIONAL COUNT | | | | | |
|---|---|---|---|---|---|
| it | was | the | best | of | times |
| 1 | 1 | 1 | 1 | 1 | 1 |

Then, in operation 206, the system 100 determines a conditional count for word pairs found in the input text data 103. In some configurations, this a raw count that considers context. Specifically in one example, it is a count of how many times a word appears after another word in the same block of text. In TABLE 2, for example, the count is how many times "best" shows up after "it."

TABLE 2

| CONDITIONAL COUNT | |
|---|---|
| it, best | 1 |
| it, of | 1 |
| it, times | 1 |
| was, of | 1 |
| was, times | 1 |
| the, times | 1 |

Next, at operation 208, the system 100 determines a value that indicates a correlation between two words in the input text data 103. The correlation between two words is quantified by a value referred to herein as an "adjustment factor," which is the change of probability of the one word given that we have the other word.

The adjustment factor may be calculated using a number of different techniques. For instance, the correlation between the words "best" and "times" may have an adjustment factor that is based on a process that combines at least two noise filters. One or more technologies can be used for combining noise filters, including a technology referred to as discounting. Although the disclosure herein describes certain ways to determine an adjustment factor, there may be a number of techniques for determining this value. For example, techniques described herein may utilize any technique for determining the adjustment factor based on the conditional count and the unconditional count.

As described herein, configurations may utilize any technique for determining a conditional probability by applying the adjustment factor to the unconditional probability. This allows for the contextual awareness of a related topic. The determined adjustment factor may be associated with word pairs and stored in a data structure having any format. For illustrative purposes, the data structure storing word pairs with the adjustment factor is referred to herein as a "correlation table."

Figure 4:
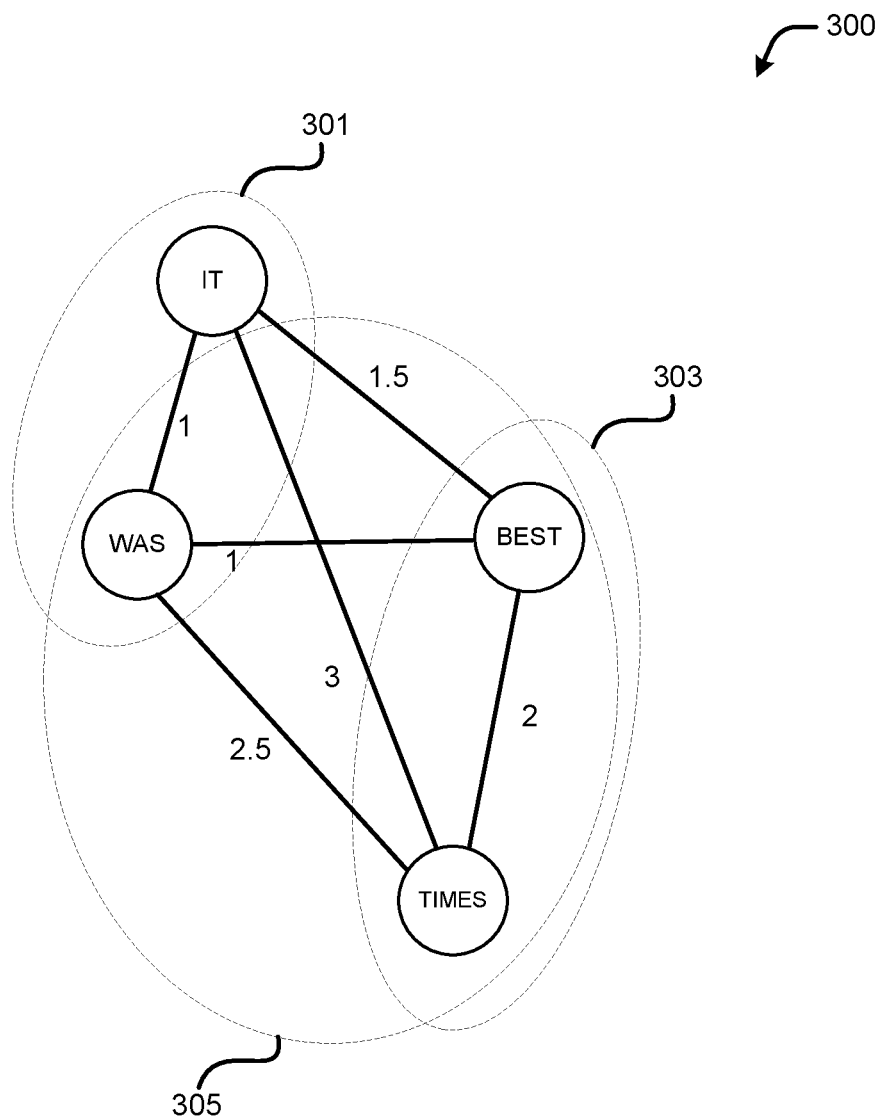
FIG. 4 is an example of a structure showing correlations between words and word clusters.

Next, at operation 210, the system 100 determines a number of word clusters. In general, from the input text data 103, word combinations are grouped. The groupings may include any number of words, e.g., one word up to a larger number exceeding thousands of words. FIG. 4 illustrates an example of a number of word clusters 301-305. For illustrated purposes, each oval in dashed lines represent a word cluster. In this example, the first word cluster 301 includes the word "it" and "was," the second word cluster 303 includes the words "best" and "times," and the third cluster 305 includes the words "was," "best," and "times." Of course, there may be more clusters than shown herein, these are provided for illustrative purposes.

Also shown in FIG. 4, a word correlation model 300 is provided to show the correlations between the words of the input text data 103. For example, this representation illustrates the relationships between words and a corresponding adjustment factor between each word. For example, the adjustment factor associated with the word pair "it" and "was" is equal to one (1), the adjustment factor associated with the word pair "best" and "times" is equal to two (2), and the adjustment factor associated with the word pair "was" and "times" is equal to two and half (2.5), etc.

One example data structure representing the clusters may be represented by a table of data having cluster identifiers ("cluster IDs") associated with each word in the clusters. For example a table may include the following structure.

TABLE 3

| WORD | List of Cluster (IDs) containing the word |
|---|---|
| Best | 1, 17, 250, 117, 32 |
| times | 17, 214, 112, 1, 20 |
| was | 12, 34, 23, 18, 20 |

In this example, the word "best" is in four clusters with the IDs of "1, 17, 250, 117" and the word "times" is in four clusters with the IDs of "17, 214, 112, 1."

In some configurations, the process of determining the clusters also involves a process of filtering data associated with the clusters. In general, the filtering process involves ranking data associated with the clusters and filtering the data that does not meet a threshold.

In some configurations, the adjustment factor that is associated with word pairs is used to determine a cluster density. A number of different techniques may be used to determine a cluster density, which represents the relevancy of each cluster. For example, the cluster density may be an average of each adjustment factor for words in a particular cluster. In some configurations, the cluster density is used to rank the cluster against other clusters. As described herein, those rankings are used by techniques herein to sort priority of clusters for relevancy. For example, the cluster density of the third cluster shown in FIG. 4 would be 1+2.5+2/3=2.17, given that the words in this cluster are "was," "best" and "times."

In some configurations, the clusters may be ranked by the use of other data. One example illustrating such configurations is shown on TABLE 3. As shown, the clusters are actually ranked by an average correlation between the word in question and the words contained in the cluster. For example, the average correlation between the word "times" and each individual word in cluster 17 is higher than the average correlation between the word "times" and the words in any other single cluster. This technique may be used as a distinct process from the techniques using the cluster density. As described herein, techniques using the cluster density compares all of the words in a cluster with one another, rather than comparing one word (which may or may not be in a cluster) with all of the words in the cluster. In some configurations, the techniques using the average correlation between a word and individual words in the clusters may be used in conjunction with the techniques using the cluster density.

Figure 5:
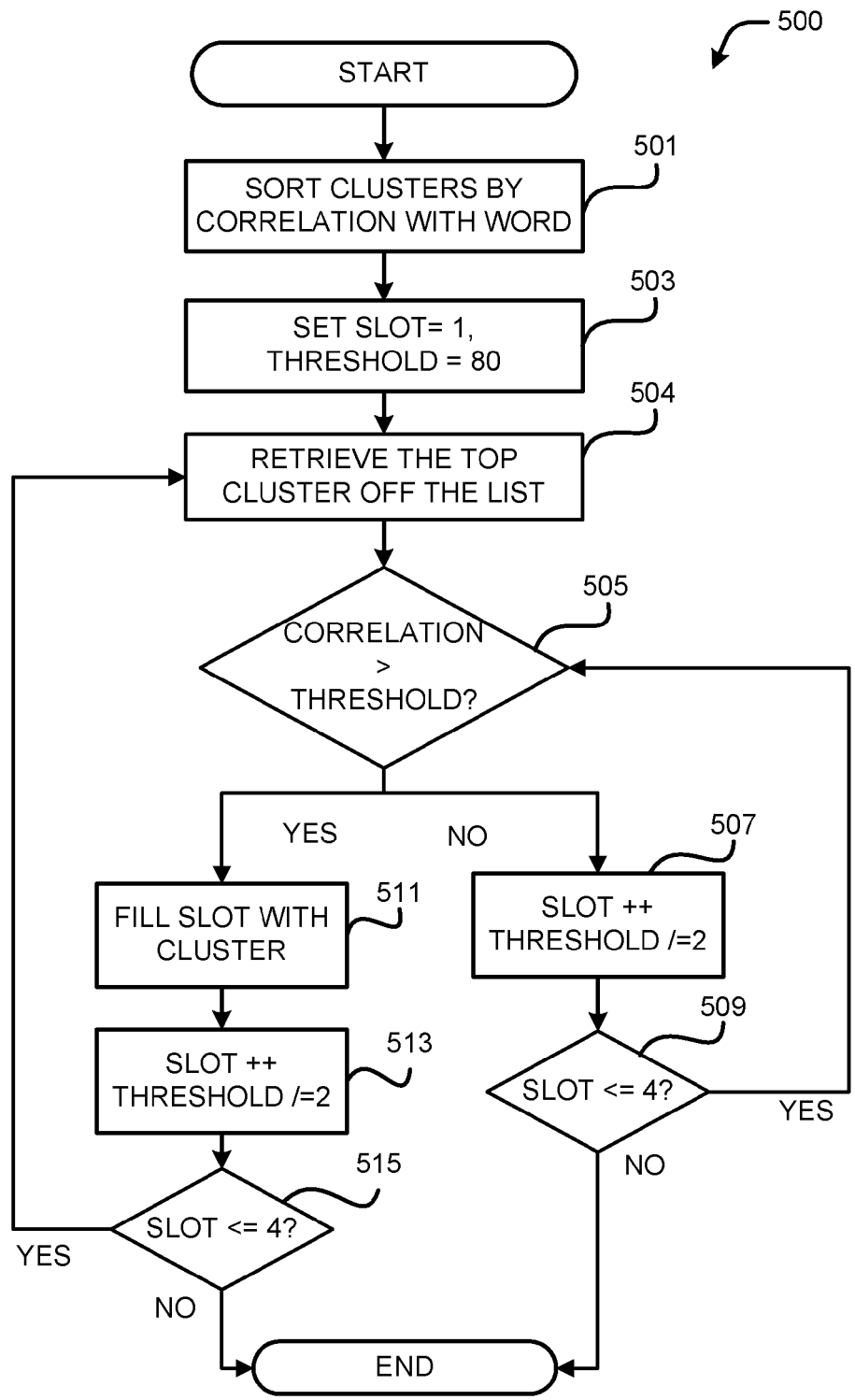
FIG. 5 is a flow diagram illustrating aspects of an example routine for processing cluster data.

In addition, data of TABLE 3 may be filtered based on this generated data. For instance, the number of clusters associated with each word may be filtered based on the cluster density meeting a threshold. Thus, instead of using an exhaustive list of cluster IDs, computing resources and potentially network bandwidth may be saved by having this filtered version of the dataset. One or more techniques for processing the cluster data can be utilized. An illustrative example is shown in FIG. 5 and described in more detail below.

Next, at operation 212, the system 100 reconstructs the adjustment factor based on the determined cluster data. In some configurations, the number of correlations between two words may be used to reconstruct the adjustment factor. For example, in TABLE 3, the adjustment factor for the word pair "best" and "times" may be reconstructed based on the fact that there are two common clusters between the words, e.g., cluster 1 and cluster 17 are common clusters between these words.

In some configurations, as an optional feature, the reconstruction of the adjustment factor may be based on the ranking of the clusters of each word. In the current example of TABLE 3 involving the word pair "best" and "times," not only can the number of common clusters be used to reconstruct the adjustment factor, the position of the correlating clusters may be used. For example, the cluster ID=17 and cluster ID=1 are ranked relatively high, thus, this ranking may have more impact than cluster ID=20, which is ranked relatively low.

The techniques disclosed herein for determining a reconstructed adjustment factor, e.g., a correlation, for a word pair may use any process for determining a correlation or quantifiable relationship for any word pair using cluster data and/or data representing a cluster density. In operation 212, the reconstructed adjustment factors and the associated word pairs may be stored in a data structure, e.g., an output 115, of the process. One example of a correlation table having original adjustment factors is shown in TABLE 4. In this example, the value of 5491 increases the probability of occurrence of the word "best" based on the appearance of "it" by about a factor one million times. An example of related techniques involving the determination of an activation coefficient is described below and summarized above.

TABLE 4

| CORRELATION TABLE | |
|---|---|
| it, best | 5491.4153671374806 |
| it, of | 5402.7723901902709 |
| it, times | 5301.2354238547159 |
| was, of | 5280.9571079257323 |
| was, times | 5190.6010198867662 |
| the, times | 5168.6583668275723 |

As described in other sections herein, the data of the correlation table, the output 115, may be used by one or more techniques for adjusting a freshness value and one or more probabilities associated with word candidates. Thus, after operation 212, the routine 200 may transition into another routine described herein or data produced by routine 200 may be used by other routines and/or techniques described herein.

Figures 3A, 3B:
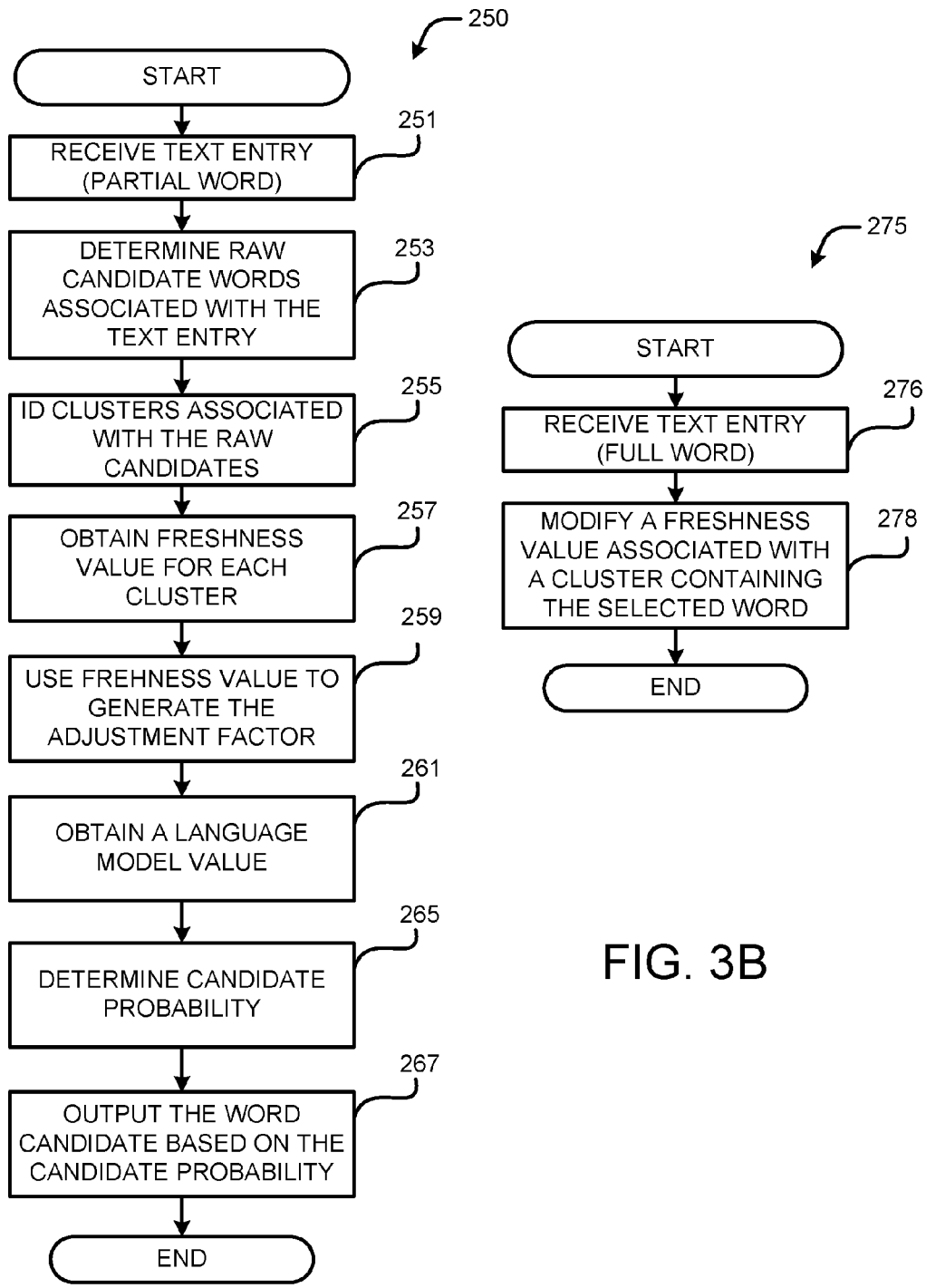
FIGS. 3A and 3B describe a routine that may be used during use of a device storing and utilizing a correlation table.

Generally described, FIG. 3A and FIG. 3B described routines that may be used during use of a device storing and utilizing a correlation table. Specifically, FIG. 3A is an example route 250 for generating a word candidate probability and suggesting a word candidate based on the probability when part of a word entered by a user. FIG. 3B is an example route 275 for updating data, such as a freshness value, based on the receipt of a full word.

Although these routines are shown in two separate diagrams, it can be appreciated that these techniques can be combined and run in the same program, and run in parallel. Thus, while a user is entering characters of an incomplete word, operations of routine 250 are used to find the word candidates. When a word candidate is selected or a full word is typed and entered, operations of routine 275 are used to update data that is used to suggest word candidates. By providing the benefits of both routines, contextually relevant topics may be identified while a user is entering text.

FIG. 3A illustrates an example process for providing word suggestions for text entries with partially complete words. The routine starts at operation 251, where a device receives input text entry. As characters are entered, the characters are processed to generate word candidates using the techniques described herein.

When characters are received, the routine 250 proceeds at operation 253 where the system 100 determines one or more words associated with the text entry. For example, if the characters "P" and "I" are entered, that pattern is searched in one or more resources having words with the character combination of the input. In one example, a list of words may come from a dictionary or a language model dictionary. For example, an entry of "P" and "I" may return raw candidates from a dictionary or database, which may return the words "pie," "piece," "pire," "pit," "pizza," and "pine." For illustrative purposes, the words determined in operation 253 are also referred to herein as "raw candidates."

Next, at operation 255, the system 100 identifies clusters associated with the raw candidates. The processing of operation 255 may include a search for the raw candidates within a data structure representing a number of clusters. The output of this operation may include a number of cluster IDs associated with the words. In the above example, the system 100 would produce cluster IDs for clusters containing the words "pie," "piece," "pire," "pit," "pizza," and "pine."

Next at 257, the system 100 obtains a freshness factor based on the clusters determined in operation 253. In some configurations, the freshness factor may be derived from a data structure, such as the Cluster Activation State Table shown in TABLE 5.

TABLE 5

Cluster Activation State Table

| Cluster ID | | Freshness Value | Words |
|---|---|---|---|
| 0 | -> | 0.0 | [word 1, word 2, . . .] |
| 1 | -> | 1.5 | [word 3, word 4, . . .] |
| 2 | -> | −2.0 | [word 5, word 6, . . .] |
| 3 | -> | −1.5 | [word 7, word 8, . . .] |
| 4 | -> | −3.0 | [word 9, word 10, . . .] |
| . . . | | | |
| 256 | -> | −6.0 | [word (n − 1), word n, . . .] |

In this example, the data structure defining the cluster activation state may include a cluster ID and an associated freshness value. The data structure may also include the words or pointers to the words of the individual clusters. As will be described below, the freshness value indicates how recent a word of a cluster was entered into a device. Thus, in general, the freshness value will identify clusters having recently used words. In operation 257, by the use of the cluster IDs obtained in operation 255, the freshness value for each cluster is determined.

Next, at operation 259, the system 100 determines an adjustment factor based on the freshness value. The adjustment factor determined in operation 259 may be determined using any suitable technique that is based on the freshness value. In one example, for a particular raw candidate word, the freshness values for all associated clusters may be summed. In another example, the cluster activation state table may include a number of coefficients that may be applied as a multiplier to values used to determine the adjustment factor.

Then at operation 261, the system 100 obtains a language model value from a language dictionary or another resource. In one example, a general text prediction dictionary assigns a probability to every word. In some configurations, this probability, which is referred to herein as a "usage value" and a "language model value" is a raw probability in which words are universally used in a null context. Based on the raw word candidates obtained in operation 253, the associated language model values may be obtained.

Then at operation 265, the system 100 determines a candidate probability based on the language model value and the adjustment factor. Any technique for combining these values to determine a probability may be used in operation 265.

Next, at operation 267, the system 100 produces an output displaying a word candidate based on the candidate probability. It can be appreciated that some or all operations of routine 250 may be repeated to obtain a candidate probability for multiple word candidates. Multiple word candidates may be then displayed to a user. The display may sort the word candidates based on the candidate probability for individual word candidates, with the sorting positioning word candidates with the highest candidate probability near the beginning of a listing.

Now turning to FIG. 3B, details of the example route 275 for updating data, such as a freshness value, are described. As summarized above, when a word candidate is selected or a full word is typed and entered, operations of routine 275 are used to update data that is used to suggest word candidates.

The routine starts at operation 276, where a device receives an input including a full word. As noted above, this part of the process could include a user input where the user types in the full word or where the user selects a full word based on a suggestion. Any form of input may be used in this operation including text received from another machine. The input may be from a keyboard and/or a gesture-based technology involving speech and/or movements of a user.

Next, at operation 278, a data structure defining a cluster activation state is updated based on the input. With reference to TABLE 5, a data structure defining the cluster activation state may include a cluster ID and an associated freshness value. The data structure may also include the words, or pointers to the words, of the individual clusters.

In operation 278, as a word is indicated, entered or selected by the input, a cluster containing the word is raised in priority. For example, with reference to TABLE 5, the freshness value of cluster ID=3 may be modified, if [word 7] is received. The freshness value may be modified to a value indicating that the associated cluster is more relevant or current. Any value or technique for prioritizing clusters based on the timing of an input including an associated word may be used in operation 278.

In addition to adjusting the freshness value when a word is received, the system 100 may also continually modify the freshness values of the Cluster Activation State Table back to a normal point, e.g., a value of zero, over a period of time. This decay of the freshness value helps the system 100 monitor usage trends of certain words and helps distinguish current topics over topics that have not been raised recently.

In some configurations, techniques disclosed herein identify a default context, which is also referred to herein as a default topic. In general, the selection of a default context may be based on data structures defining cluster profiles. In one aspect, a cluster profile represents an average cluster activation state in a particular context. For instance, a cluster of profile for a particular application, such as a fantasy football program, may store relevant data, such as the average cluster activation state, for each person using the application. In addition to storing a cluster profile for a particular application, the system 100 may store and update average cluster activation state data relevant to individual users.

Thus, when a person uses the application, the techniques described herein may utilize the cluster profile for the application and the cluster profile for the user. The data from each cluster profile may be averaged to identify and/or generate data that can be used to identify word candidates.

These examples are provided for illustrative purposes only and are not to be construed as limiting. As any type of application may have an associated cluster profile. For instance, a cluster profile may be maintained for an email program for all users. As can be appreciated, the freshness value of the average cluster activation state data store may be updated as users provide text entries. Context related to the application and/or context related to the user may help identify more relevant topics and/or more relevant word candidates. The techniques described herein may access the one or more cluster profiles to obtain, update and/or generate a freshness value, which is used to obtain word candidates.

When utilizing clusters as described herein, there can be two stages in the process where values are utilized. For example, as described above, when a user types a word in a document, the techniques disclosed herein can change the activation coefficient. Then, when the word is typed a subsequent time, the techniques disclosed herein references the activation coefficient.

A value can be used to quantify an association of a word with a cluster, this is also referred to herein as the "activation coefficient." For example, a word can have a "strong" association with a cluster, or a "weak" association with a cluster. In one specific example, if a word that is typed earlier in a document is strong with respect to a cluster and a subsequently typed word is strong with respect to the same cluster, then the effect is strong. In another example, if a word that is typed earlier in a document is weak with respect to a cluster and a subsequently typed word is weak with respect to the same cluster, then the effect is weak. In yet another example, if a word that is typed earlier in a document is strong with respect to a cluster and a subsequently typed word is weak within the same cluster, then the effect is somewhere between strong and weak. The equations described herein enable the combination of two or more values maintaining the same scale as the original value. The examples are provided for illustrative purposes and are not to be construed as limiting, as the two values can be combined in other ways, some of which may include the multiplication of the two values.

Now referring to FIG. 5, a flow diagram illustrating aspects of an example routine for processing cluster data is shown and described below. In some cases, clusters that are created by the techniques disclosed herein may be subject to further processing since they can have the property of having only one cluster per word. In one illustrative example, consider a sample data set where each word has four cluster slots.

The routine starts at operation 501 where a computing device sorts the clusters by a correlation. For example, given a word, a computer can sort a list of clusters in descending order of average correlation with that word. The clusters can be sorted into a list.

Next, at operation 503, a slot and a threshold can be established. In this example, the slot is set to 1 and the inclusion threshold is set to eighty (80). These values are provided for illustrative purposes and are not to be construed as limiting as other suitable value can be used. Then, at operation 504, the computing device retrieves the top cluster off the list.

Next, at operation 505, computing device determines if the correlation is greater than the threshold. If the correlation is not greater than the threshold, the routine 500 proceeds to operation 507 where the routine 500 proceeds to the next slot and lowers the threshold. The example shown in operation 507 is for illustrative purposes, the threshold can be reduced using any suitable technique. Next, at operation 509, the computing device determines if there are any remaining slots. If there are remaining slots, the routine 500 returns to operation 505. If there are no more remaining slots, the routine 500 terminates.

At operation 505, if the computing device determines that the correlation is greater than the threshold, the routine 500 proceeds to operation 511 where the computing device fills the slot with the cluster. Following operation 511, at operation 513, the computing device moves to the next slot. In this example, the slot is incremented and the threshold is lowered. Again, the example of FIG. 5 is provided for illustrative purposes, the threshold can be reduced by any suitable value.

Next, at operation 515, the computing device determines if there are any remaining slots. If there are remaining slots, the routine 500 returns to operation 504 where the next cluster is retrieved from the list. If there are no more remaining slots, the routine 500 terminates.

Using the example described above and shown in FIG. 5, an example involving the determination of an activation coefficient is described below. In this example, the language model maintains a vector representing the "activation state" of each cluster. The premise is that the use of a word or a multi-word entity (MWE) should "activate" each of the clusters that contains that word or MWE, and subsequently suggestions in more-active clusters should be preferred over suggestions in less-active clusters. For illustrative purposes, an MWE refers to an n-gram that is a meaningful unit, and the meaning of which is not strongly related to the meaning of its individual words (e.g. "heart attack," "hot dog").

Also, in this example, the computing device is configured to maintain a circular buffer of the last 50 words that are typed. Thus, when the 51st word is typed, the computing device can reverse the cluster activation of the 1st word before the computing device activates the 51st word's clusters. There are multiple ways to handle MWEs, but techniques can reverse the activation for the individual words that make up a MWE when we detect that a MWE has been typed. For example, the meaning of "hot dog" is completely semantically unrelated to the meanings of "hot" and "dog." This example is provided for illustrative purposes and is not to be construed as limiting. Other techniques may be used to control the activation so it does not grow without bound. For example, instead of the reverse method described above, an activation can decay over time. In one illustrative example, each time a word is typed, the activation can be reduced by a predetermined amount, e.g., two percent or another amount.

The cluster membership ranks from various techniques, including the example provided above, can determine both how much clusters are activated when a word is typed, and how much a suggested word's cost is affected by the activation level of its clusters. For example, when a word is typed the following routine can be used:

for each slot:
    if the word has a cluster in this slot:
        boost the activation of the cluster by the activation coefficient associated with this slot When the language model generates a candidate:

for each slot:
    if the candidate has a cluster in this slot:
        adjust the cost of the candidate by the activation coefficient associated with this slot multiplied by the current activation of the cluster The "activation coefficient" can be determined for each slot as follows. With reference to the example above and shown in FIG. 5, each slot can have a certain average correlation threshold for a cluster to be placed there, e.g., 80, 40, 20, and 10 respectively. It can be appreciated that a typical correlation of a word with a cluster in a particular slot will be halfway between the threshold and the next highest threshold, e.g., multiply by 3/2. In some configurations, a result can come from taking the square root, because a calculation can multiply by this coefficient both when the cluster is activated and when a cost of a candidate is adjusted.

$$AC_{slot} = \sqrt{\frac{3}{2}\text{threshold}_{slot}}$$

For example, given a word with all four cluster slots filled, typing it once can reduce the cost of typing it a second time by $$\Sigma_{slot}\left(\sqrt{\frac{3}{2}\text{threshold}_{slot}}\right)^2 =$$

$$\frac{3}{2}(80 + 40 + 20 + 10) = 225 \text{ log} - \text{prob points,}$$

in a particular implementation with a given scale, could correspond to roughly doubling its probability of appearing in the next 50 words.

In some configurations, a process can normalize the activation state across all clusters, so that the sum of the activation of all clusters is always zero. Every time a cluster is activated by a certain amount, all other clusters are deactivated by a small amount in order to maintain this invariant. For example, if a process activates one cluster (out of 255) by "x" points, the process would adjust the activation of all other clusters by "−X/254" points. If not for this, it would produce a probability advantage for a word to appear in any cluster, so the effective average probability of very common words which do not appear in any clusters (such as "the") would decrease for no principled reason. By allowing some clusters to have a negative activation state, the techniques herein tell the language model to prefer common unclustered words over words in these clusters.

Figure 6:
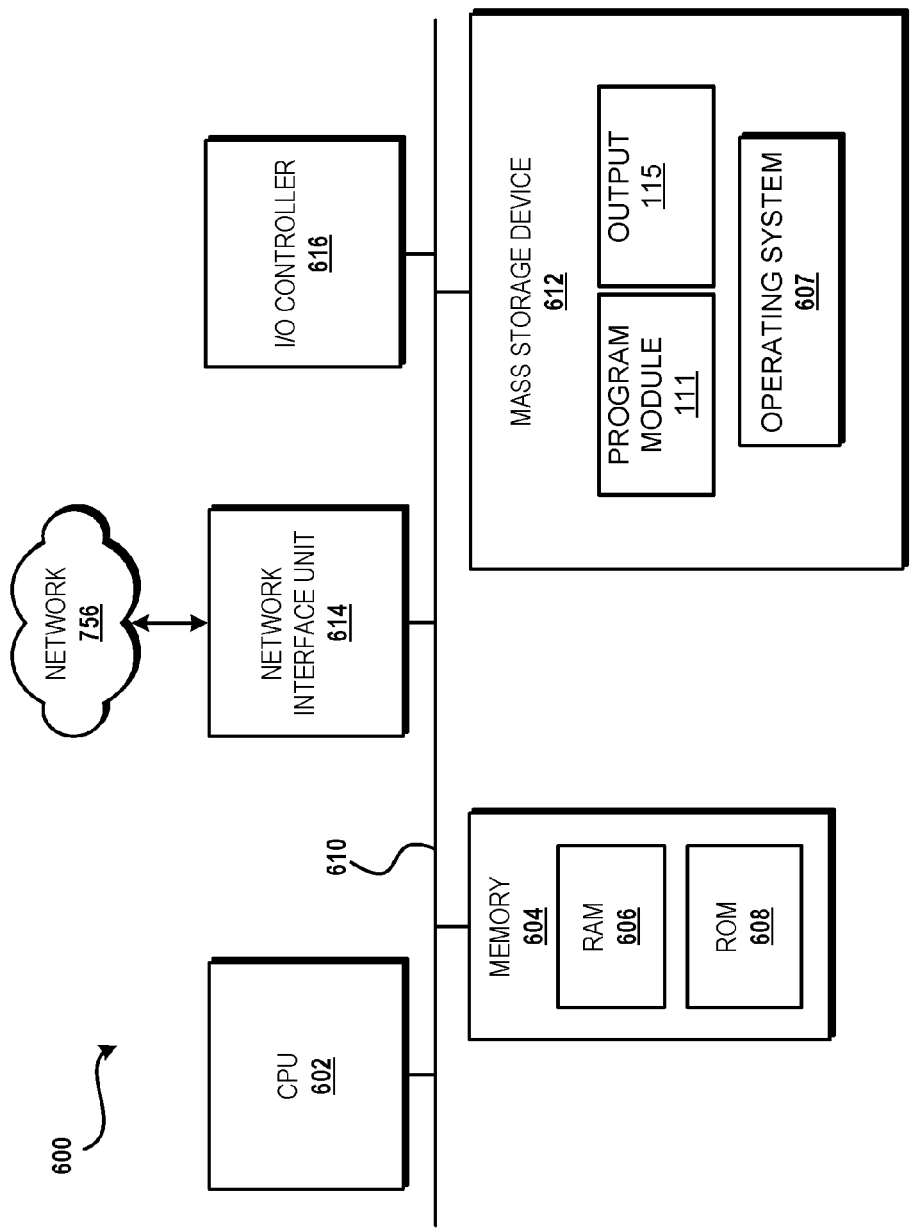
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a computer, such as the computing device 101 (FIG. 1), capable of executing the program components described above for providing topically aware word suggestions. Thus, the computer architecture 600 illustrated in FIG. 6 illustrates an architecture for a server computer, mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, and one or more application programs including, but not limited to, a program module 111 and an output 115.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 756 and/or another network (not shown). The computer architecture 600 may connect to the network 756 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
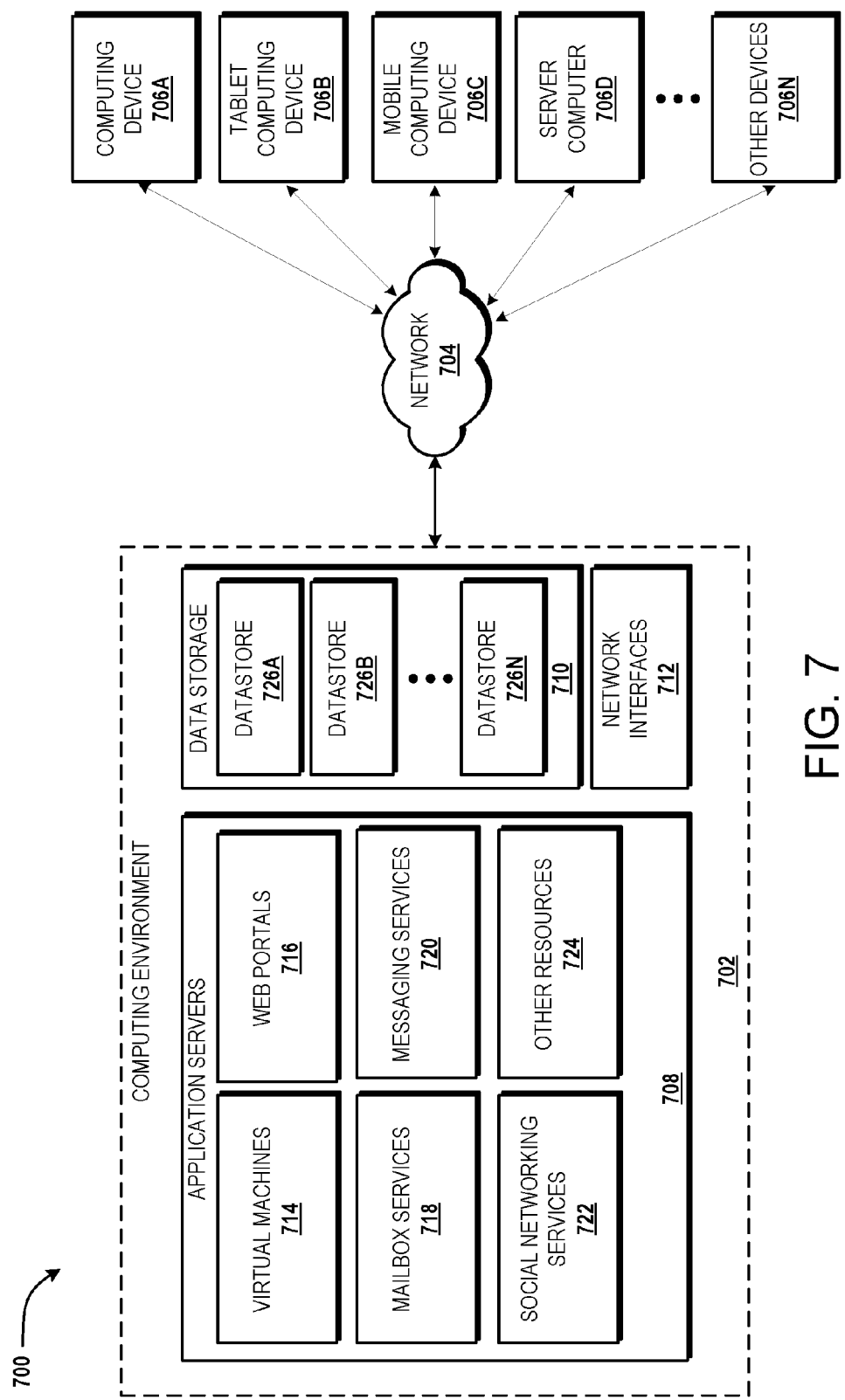
FIG. 7 is a diagram illustrating a distributed computing environment capable of implementing aspects of the techniques and technologies presented herein.

FIG. 7 depicts an illustrative distributed computing environment 700 capable of executing the software components described herein for providing topically aware word suggestions. Thus, the distributed computing environment 700 illustrated in FIG. 7 can be utilized to execute any aspects of the software components presented herein. For example, the distributed computing environment 700 can be utilized to execute aspects of the web browser 610, the content manager 105 and/or other software components described herein.

According to various implementations, the distributed computing environment 700 includes a computing environment 702 operating on, in communication with, or as part of the network 704. The network 704 may be or may include the network 756, described above with reference to FIG. 5. The network 704 also can include various access networks. One or more client devices 706A-706N (hereinafter referred to collectively and/or generically as "clients 706") can communicate with the computing environment 702 via the network 704 and/or other connections (not illustrated in FIG. 7). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 6 and 8. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for providing topically aware word suggestions. It should be understood that this configuration is illustrative, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein for providing topically aware word suggestions. For instance, any one of the application servers 708 may communicate or facilitate the functionality and features described herein. For instance, a social networking application, mail client, messaging client or a browser running on a phone or any other client 706 may communicate with a networking service 722 and facilitate the functionality, even in part, described above with respect to FIG. 4.

As shown in FIG. 7, the application servers 708 also can host other services, applications, portals, and/or other resources ("other resources") 724. The other resources 724 can include, but are not limited to, document sharing, rendering or any other functionality. It thus can be appreciated that the computing environment 702 can provide integration of the concepts and technologies disclosed herein provided herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 7, the datastores 726 also can host or store web page documents, word documents, presentation documents, data structures, algorithms for execution by a recommendation engine, and/or other data utilized by any application program or another module, such as the content manager 105. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the clients 706 and the application servers 708. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the clients 706. It should be understood that the clients 706 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing topically aware word suggestions, among other aspects. In one specific example, as summarized above, techniques described herein may be implemented, at least in part, by the web browser application 510 of FIG. 6, which works in conjunction with the application servers 708 of FIG. 7.

Figure 8:
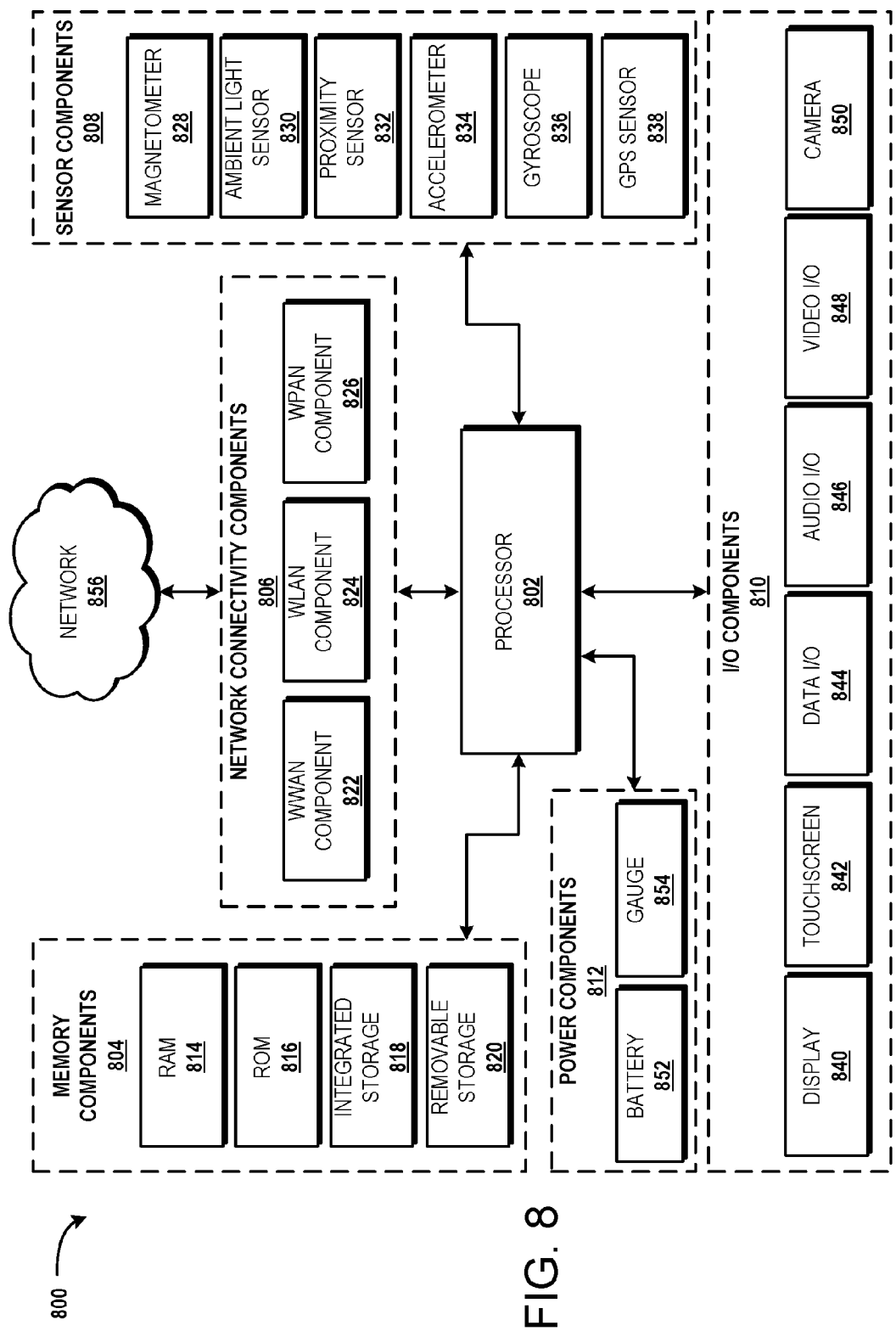
FIG. 8 is a computer architecture diagram illustrating a computing device architecture for a computing device capable of implementing aspects of the techniques and technologies presented herein.

Turning now to FIG. 8, an illustrative computing device architecture 800 for a computing device that is capable of executing various software components described herein for providing topically aware word suggestions. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the clients 706 shown in FIG. 7. Moreover, aspects of the computing device architecture 800 may be applicable to traditional desktop computers, portable computers (e.g., laptops, notebooks, ultra-portables, and netbooks), server computers, and other computer systems, such as described herein with reference to FIG. 6. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 604 of FIG. 6. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience.

Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

What is claimed is:

1. A method for generating a word candidate to assist a user providing an input to a computing device, comprising:
 receiving, at the computing device, the input containing a plurality of words, wherein the computing device performs the operations of:
  determining a conditional count;
  determining an unconditional count;
  determining an adjustment factor for a pair of words of the plurality of words based on the unconditional count and the conditional count;
  generating a data structure defining a plurality of word clusters, individual word clusters of the plurality of word clusters include at least one word of the plurality of words;
  reconstructing the adjustment factor of the pair of words based on a number of common clusters between individual words of the pair of words;
  determining a candidate probability associated with the word candidate based, at least in part, on the reconstructed adjustment factor, wherein the word candidate is selected from individual words associated with the plurality of word clusters;
  generating an output containing the word candidate based, at least in part, on the candidate probability; and
  displaying the word candidate on a display screen of the computing device.

2. The method of claim 1, further comprising:
 obtaining an input indicating a word; and
 reconstructing a freshness value associated with one or more word clusters containing the word, the modification to the freshness value indicating that the one or more word clusters containing the word are more recent than other word clusters of the plurality of word clusters.

3. The method of claim 1, further comprising:
 receiving a text entry;
 determining one or more word clusters of the plurality of word clusters associated with the text entry;
 obtaining a freshness factor associated with the one or more word clusters of the plurality of word clusters associated with the text entry;
 obtaining a related adjustment factor associated with the one or more word clusters;
 obtaining a language model value; and
 determining the candidate probability associated with the word candidate based, at least in part, on the language model value and the related adjustment factor, wherein the word candidate is selected from individual words associated with the plurality of word clusters.

4. The method of claim 3, further comprising:
 determining a plurality of word candidates, wherein individual words of the plurality of word candidates comprise an individual candidate probability based, at least in part, on the language model value and the related adjustment factor;
 generating data indicating a ranking of the word candidate and the individual words of the plurality of word candidates based, at least in part, on the individual candidate probabilities and the candidate probability; and
 generating an output indicating the ranking.

5. The method of claim 4, wherein the language model value comprises a probability in which a word associated with the text entry is universally used in a null context.

6. The method of claim 1, wherein reconstructing the adjustment factor of the pair of words is also based on a ranking of at least one correlation between the words.

7. The method of claim 1, wherein reconstructing the adjustment factor of the pair of words comprises:
 determining a cluster density for individual clusters of the plurality of clusters;
 determining an ordering of the plurality of clusters based on the cluster density for the individual clusters; and reconstructing the adjustment factor based on the ordering of the plurality of clusters and the number of common clusters between individual words of the pair of words.

8. A computing device for generating a word candidate to assist a user providing an input to the computing device, comprising:
a processor; and
a memory having a set of computer-executable instructions stored thereupon which, when executed by the processor, cause the computing device to
receive, at the computing device, the input containing a plurality of words;
determine a conditional count;
determine an unconditional count;
determine an adjustment factor for a pair of words of the plurality of words based on the unconditional count and the conditional count;
generate a data structure defining a plurality of word clusters, individual word clusters of the plurality of word clusters include at least one word of the plurality of words;
reconstruct the adjustment factor of the pair of words based on a number of common clusters between individual words of the pair of words;
determine a candidate probability associated with the word candidate based, at least in part, on the reconstructed adjustment factor, wherein the word candidate is selected from individual words associated with the plurality of word clusters;
generate an output containing the word candidate based, at least in part, on the candidate probability; and
display the word candidate on a display screen of the computing device.

9. The computing device of claim 8, wherein the computer-executable instructions cause the computing device to:
obtain an input indicating a word; and
reconstruct a freshness value associated with one or more word clusters containing the word, the modification to the freshness value indicating that the one or more word clusters containing the word are more recent than other word clusters of the plurality of word clusters.

10. The computing device of claim 8, wherein the computer-executable instructions cause the computing device to:
receive a text entry;
determine one or more word clusters of the plurality of word clusters associated with the text entry;
obtain a freshness factor associated with the one or more word clusters of the plurality of word clusters associated with the text entry;
obtain a related adjustment factor associated with the one or more word clusters;
obtain a language model value; and
determine the candidate probability associated with the word candidate based, at least in part, on the language model value and the related adjustment factor, wherein the word candidate is selected from individual words associated with the plurality of word clusters.

11. The computing device of claim 10, wherein the computer-executable instructions cause the computing device to:
determine a plurality of word candidates, wherein individual words of the plurality of word candidates comprise an individual candidate probability based, at least in part, on the language model value and the related adjustment factor;
generate data indicating a rank of the word candidate and the individual words of the plurality of word candidates based, at least in part, on the individual candidate probabilities and the candidate probability; and
display data indicating the rank of the word candidate and the individual words.

12. The computing device of claim 11, wherein the language model value comprises a probability in which a word associated with the text entry is universally used in a null context.

13. The computing device of claim 8, wherein reconstructing the adjustment factor of the pair of words is also based on a ranking of at least one correlation between the words.

14. The computing device of claim 8, wherein reconstructing the adjustment factor of the pair of words comprises:
determining a cluster density for individual clusters of the plurality of clusters;
determining an ordering of the plurality of clusters based on the cluster density for the individual clusters; and
reconstructing the adjustment factor based on the ordering of the plurality of clusters and the number of common clusters between individual words of the pair of words.

15. A computer-readable storage medium having computer-executable instructions stored thereupon which, when executed by a computing device, cause the computing device to generate a word candidate to assist a user providing an input to the computing device, wherein the computing device performs the operations of:
receiving, at the computing device, the input containing a plurality of words;
determining a conditional count;
determining an unconditional count;
determining an adjustment factor for a pair of words of the plurality of words based on the unconditional count and the conditional count;
generating a data structure defining a plurality of word clusters, individual word clusters of the plurality of word clusters include at least one word of the plurality of words;
reconstructing the adjustment factor of the pair of words based on a number of common clusters between individual words of the pair of words;
determining a candidate probability associated with the word candidate based, at least in part, on the reconstructed adjustment factor, wherein the word candidate is selected from individual words associated with the plurality of word clusters;
generating an output containing the word candidate based, at least in part, on the candidate probability; and
displaying the word candidate on a display screen of the computing device.

16. The computer-readable storage medium of claim 15, wherein the computer-executable instructions cause the computing device to:
obtain an input indicating a word; and
reconstruct a freshness value associated with one or more word clusters containing the word, the modification to the freshness value indicating that the one or more word clusters containing the word are more recent than other word clusters of the plurality of word clusters.

17. The computer-readable storage medium of claim 15, wherein the computer-executable instructions cause the computing device to:
receive a text entry;
determine one or more word clusters of the plurality of word clusters associated with the text entry;

obtain a freshness factor associated with the one or more word clusters of the plurality of word clusters associated with the text entry;

obtain a related adjustment factor associated with the one or more word clusters;

obtain a language model value; and determine the candidate probability associated with the word candidate based, at least in part, on the language model value and the related adjustment factor, wherein the word candidate is selected from individual words associated with the plurality of word clusters.

18. The computer-readable storage medium of claim 17, wherein the computer-executable instructions cause the computing device to:

determine a plurality of word candidates, wherein individual words of the plurality of word candidates comprise an individual candidate probability based, at least in part, on the language model value and the related adjustment factor;

generate data indicating a rank of the word candidate and the individual words of the plurality of word candidates based, at least in part, on the individual candidate probabilities and the candidate probability; and display data indicating the rank of the word candidate and the individual words.

19. The computer-readable storage medium of claim 15, wherein reconstructing the adjustment factor of the pair of words is also based on a ranking of at least one correlation between the words.

20. The computer-readable storage medium of claim 15, wherein reconstructing the adjustment factor of the pair of words comprises:

determining a cluster density for individual clusters of the plurality of clusters;

determining an ordering of the plurality of clusters based on the cluster density for the individual clusters; and reconstructing the adjustment factor based on the ordering of the plurality of clusters and the number of common clusters between individual words of the pair of words.

\* \* \* \* \*